(12) United States Patent
Fukui et al.

(10) Patent No.: US 9,330,853 B2
(45) Date of Patent: May 3, 2016

(54) PHOTOELECTRIC CONVERSION ELEMENT

(71) Applicant: Sharp Kabushiki Kaisha, Osaka (JP)

(72) Inventors: Atsushi Fukui, Osaka (JP); Ryoichi Komiya, Osaka (JP); Ryohsuke Yamanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/366,798

(22) PCT Filed: Dec. 10, 2012

(86) PCT No.: PCT/JP2012/081896
§ 371 (c)(1),
(2) Date: Jun. 19, 2014

(87) PCT Pub. No.: WO2013/094446
PCT Pub. Date: Jun. 27, 2013

(65) Prior Publication Data
US 2014/0345678 A1 Nov. 27, 2014

(30) Foreign Application Priority Data
Dec. 22, 2011 (JP) .................................. 2011-281701

(51) Int. Cl.
*H01G 9/20* (2006.01)
(52) U.S. Cl.
CPC ........... *H01G 9/2031* (2013.01); *H01G 9/2059* (2013.01); *Y02E 10/542* (2013.01)
(58) Field of Classification Search
CPC ......... H01L 31/05; H01L 31/02; H01L 31/04; H01G 9/2031; H01M 14/00
See application file for complete search history.

(56) References Cited

U.S. PATENT DOCUMENTS

| | | | |
|---|---|---|---|
| 4,927,721 A | 5/1990 | Gratzel et al. | |
| 5,084,365 A | 1/1992 | Gratzel et al. | |
| 2011/0023932 A1* | 2/2011 | Fukui | H01G 9/2081 136/244 |
| 2012/0048337 A1* | 3/2012 | Fukui | H01G 9/2031 136/244 |
| 2013/0118570 A1* | 5/2013 | Maeda et al. | 136/256 |

FOREIGN PATENT DOCUMENTS

| | | |
|---|---|---|
| EP | 2 237 362 A1 | 10/2010 |
| JP | 01-0220380 A | 9/1989 |

(Continued)

OTHER PUBLICATIONS

International Search Report for corresponding International Application No. PCT/JP2012/081896 mailed Mar. 12, 2013.

(Continued)

*Primary Examiner* — Michael Y Sun
(74) *Attorney, Agent, or Firm* — Renner, Otto, Boisselle & Sklar, LLP

(57) ABSTRACT

A photoelectric conversion element includes an optically transparent support, a porous semiconductor layer containing fine semiconductor particles and a photosensitizer, a conductive layer, and a counter electrode provided in that order, each of the porous semiconductor layer and the conductive layer contains a carrier-transport material. The porous semiconductor layer includes at least two layers each containing fine semiconductor particles having different particle sizes. The fine semiconductor particles contained in a layer of the layers located closest to the counter electrode, the layers constituting the porous semiconductor layer, have an average particle size of 380 nm or less.

7 Claims, 3 Drawing Sheets

(56) References Cited

FOREIGN PATENT DOCUMENTS

| | | | |
|---|---|---|---|
| JP | 2001093591 A | * | 4/2001 |
| JP | 2001-283941 A | | 10/2001 |
| JP | 2001-283944 A | | 10/2001 |
| JP | 2004-039471 A | | 2/2004 |
| JP | 2006-086056 A | | 3/2006 |
| JP | 2007-073505 A | | 3/2007 |
| JP | 2008-287900 A | | 11/2008 |
| JP | WO 2010125929 A1 | * | 11/2010 ........... H01G 9/2031 |
| WO | WO 2009/075101 A1 | | 6/2009 |
| WO | WO 2009/075229 A1 | | 6/2009 |
| WO | WO 2011083527 A1 | * | 7/2011 |

OTHER PUBLICATIONS

Kroon et al., "Nanocrystalline Dye-Sensitized Solar Cells Having Maximum Performance", InterScience, Progress in Photovoltaics : Research and Applications, 2007, 15, 1-18.

* cited by examiner

PHOTOELECTRIC CONVERSION ELEMENT

TECHNICAL FIELD

The present invention relates to a photoelectric conversion element.

BACKGROUND ART

Cells capable of converting sunlight into electric power, that is solar cells, have been receiving attention as energy sources to replace fossil fuels. Nowadays, some solar cells including crystalline silicon substrates and thin-film silicon solar cells are now being commercialized. However, the former solar cells have the problem of high production costs of silicon substrates. The latter thin-film solar cells have the problem of high production costs due to the need to use various types of gases for use in the production of semiconductors and complicated devices. Thus, in any type of solar cell, continuing efforts have been made to increase photoelectric conversion efficiency in order to reduce the cost per power output. However, the foregoing problems have not sufficiently been solved.

As a new type of solar cell, a wet-type solar cell using photoinduced electron transfer in a metal complex (for example, PTL 1 (Japanese Unexamined Patent Application Publication No. 01-220380)) and a wet-type solar cell using quantum dots (for example, PTL 2 (Japanese Unexamined Patent Application Publication No. 2008-287900)) are reported. In each of the wet-type solar cells, an electrode is provided on a surface of each of two glass substrates. The two glass substrates are arranged with these electrodes facing inward in such a manner that a photoelectric conversion layer is sandwiched between the electrodes. The photoelectric conversion layer contains a photoelectric conversion material on which a photosensitizing dye adsorbs to have an absorption spectrum in the visible light region and an electrolytic material. Such wet-type solar cells are also referred to as "dye-sensitized solar cells".

The irradiation of the dye-sensitized solar cells with light generates electrons in the photoelectric conversion layer. The generated electrons move to one electrode through an external electric circuit. The electrons moved to the electrode are transported by ions in an electrolyte to opposite electrode and return to the photoelectric conversion layer. Electric energy can be taken from such a flow of electrons.

PTL 3 (Japanese Unexamined Patent Application Publication No. 2001-283941) discloses a solar cell in which a glass provided with a transparent conductive film is not used as a substrate on the light-receiving side. This solar cell includes at least a porous semiconductor layer, a conductive layer, a catalyst layer, and a counter electrode stacked in that order on a glass substrate. The solar cell does not include an expensive glass provided with transparent conductive film, thus enabling a reduction in cost. In addition, the absorption of light by a transparent conductive film can be blocked. This increases the quantity of light incident on a photoelectric conversion element, thereby increasing a current generated.

CITATION LIST

Patent Literature

PTL 1: Japanese Unexamined Patent Application Publication No. 01-220380
PTL 2: Japanese Unexamined Patent Application Publication No. 2008-287900
PTL 3: Japanese Unexamined Patent Application Publication No. 2001-283941

SUMMARY OF INVENTION

Technical Problem

In the photoelectric conversion element described in PTL 3, a current generated should be theoretically increased. However, it is commonly known that a current generated is reduced, compared with a dye-sensitized solar cell including a glass provided with a transparent conductive film described in PTL 1 or the like.

Regarding a porous semiconductor layer, a layer having a large particle size is disposed on the non-light-receiving side of a layer responsible for light absorption, and the layer having a large particle size scatters and reflects light to improve the light absorption efficiency, in some cases. However, even if such a layer is formed on the photoelectric conversion element described in PTL 3, a current generated is not increased.

The present invention has been accomplished in light of the foregoing problems. It is an object of the present invention to improve a current generated in a photoelectric conversion element in which a transparent conductive film is not provided on a light-receiving surface.

Solution to Problem

The inventors have conducted intensive studies to solve the foregoing problems and have found that the interfacial resistance between porous semiconductor layers formed of fine semiconductor particles or the interfacial resistance between a porous semiconductor layer and a conductive layer causes a reduction in the performance of a photoelectric conversion element. This finding has led to the completion of the present invention.

Specifically, a photoelectric conversion element according to the present invention includes an optically transparent support, a porous semiconductor layer containing fine semiconductor particles and a photosensitizer, a conductive layer, and a counter electrode provided in that order, each of the porous semiconductor layer and the conductive layer containing a carrier-transport material. The porous semiconductor layer includes at least two layers each containing fine semiconductor particles having different particle sizes. The fine semiconductor particles contained in a layer of the layers located closest to the counter electrode, the layers constituting the porous semiconductor layer, have an average particle size of 380 nm or less. Here, the fine semiconductor particles refer to fine particles composed of a semiconductor material.

The layer of the layers located closest to the counter electrode, the layers constituting the porous semiconductor layer, preferably contains the fine semiconductor particles having an average particle size of 10 nm or more and 100 nm or less. More preferably, the layer of the layers located closest to the counter electrode, the layers constituting the porous semiconductor layer, contains the fine semiconductor particles having an average particle size of 10 nm or more and 100 nm or less in an amount of 40% by mass or more and 90% by mass or less.

Preferably, the conductive layer is not formed of the fine conductive particles having an average particle size of 10 nm or more. The layer of the layers located closest to the counter electrode, the layers constituting the porous semiconductor layer, preferably contains the fine semiconductor particles having an average particle size of 170 nm or more. Here, the fact that "the conductive layer is not formed of fine conductive particles having an average particle size of less than 10 nm" indicates that the fine conductive particles constituting the conductive layer have an average particle size of less than 10 nm.

The fine semiconductor particles are preferably composed of titanium oxide.

The conductive layer preferably has corrosion resistance to an electrolytic solution and may be composed of at least one of titanium, nickel, and molybdenum. Here, the corrosion resistance indicates that the function (for example, conductivity performance) of the conductive layer is not easily reduced even when the carrier-transport material comes into contact with the conductive layer.

Advantageous Effects of Invention

In a photoelectric conversion element according to the present invention, for example, the interfacial resistance between layers constituting a porous semiconductor layer and the interfacial resistance between the porous semiconductor layer and a conductive layer are reduced, thereby increasing a current generated.

DESCRIPTION OF EMBODIMENTS

Figure 1:
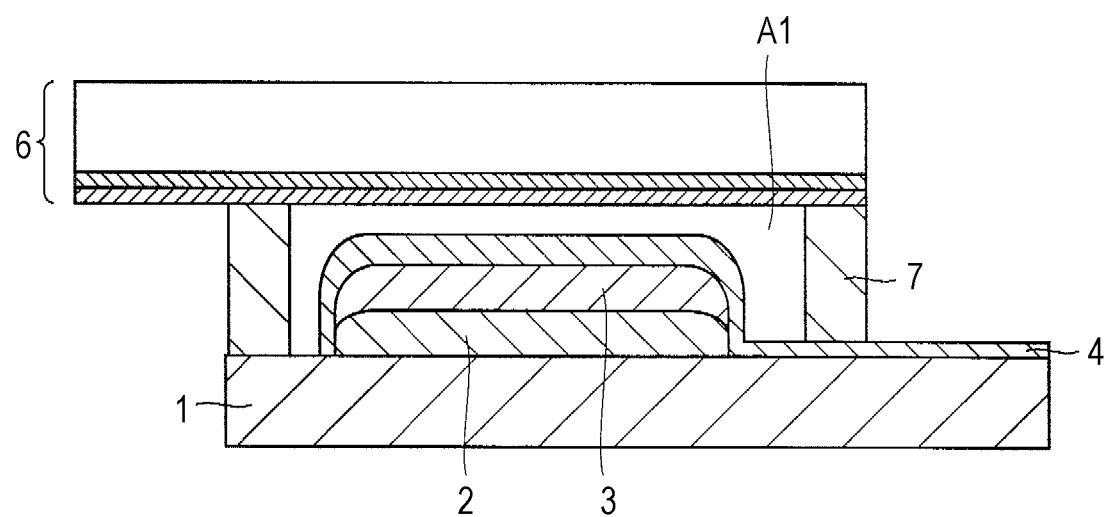
FIG. 1 is a schematic cross-sectional view of a photoelectric conversion element according to an embodiment of the present invention.

A photoelectric conversion element of the present invention will be described below with reference to the drawings. In the drawings of the present invention, the same or equivalent elements are designated using the same reference numerals. The dimensions, such as length, width, thickness, and depth, are appropriately changed for the clarification and simplification of the drawings and do not express the actual dimensions.
<Photoelectric Conversion Element>
FIG. 1 is a schematic cross-sectional view of a photoelectric conversion element according to an embodiment of the present invention. The photoelectric conversion element according to the present invention includes a photoelectric conversion layer, a conductive layer 4, and a counter electrode 6 provided in that order on an optically transparent support 1. Preferably, a clearance between the conductive layer 4 and the counter electrode 6 is filled with a carrier-transport material A1, and the carrier-transport material A1 is sealed with a sealing member 7. As described above, the photoelectric conversion element according to the present invention does not include a transparent conductive film. Thus, according to the present invention, it is possible to provide the photoelectric conversion element at low cost.

In the photoelectric conversion element according to the present invention, the photoelectric conversion layer includes a photosensitizer adsorbed on the porous semiconductor layer filled with the carrier-transport material. In the photoelectric conversion element according to the present invention, a current generated is increased by controlling the average particle size of fine semiconductor particles included the porous semiconductor layer.

In the photoelectric conversion element, light is incident from the optically transparent support 1 side. Light passing through the optically transparent support 1 is incident on the photoelectric conversion layer to generate electrons in the photoelectric conversion layer. The generated electrons are taken to the outside of the photoelectric conversion element through the conductive layer 4 and move to the counter electrode 6 through an external electric circuit. The electrons moved to the counter electrode 6 return to the photoelectric conversion layer through the carrier-transport material A1 with which the clearance between the conductive layer 4 and the counter electrode 6 is filled.
<Optically Transparent Support>
A material constituting the optically transparent support 1 is preferably a material having optical transparency because a portion of the photoelectric conversion element serving as a light-receiving surface needs to have optical transparency. For example, the optically transparent support 1 may be formed of a glass substrate composed of, soda-lime glass, fused silica glass, or crystalline silica glass, or a flexible film composed of a heat-resistant resin material. However, even if the optically transparent support 1 is used as a light-receiving surface, the optically transparent support 1 may substantially transmit light with a wavelength to which at least a sensitizing dye described below is effectively sensitive. The optically transparent support 1 need not necessarily transmit all light having any wavelength. The optical transparency indicates that the substrate transmits light having an intensity of 80% or more and preferably 90% or more of that of incident light.

Examples of a material constituting the flexible film (hereinafter, referred to as a "film") include tetraacetylcellulose (TAC), polyethylene terephthalate (PET), polyphenylene sulfide (PPS), polycarbonate (PC), polyarylate (PA), polyetherimide (PEI), phenoxy resins, and Teflon (registered trademark).

In the case where another layer is formed on the optically transparent support 1 while being heated, for example, in the case where a porous semiconductor layer is formed on the optically transparent support 1 while being heated at about 250° C., Teflon (registered trademark) having a heat resistance of 250° C. or higher is particularly preferably used among those materials for the film.

When a completed photoelectric conversion element is attached to another structure, the optically transparent support 1 may be used. Specifically, the periphery of the optically transparent support 1 formed of, for example, a glass substrate may be easily attached to another structure with a machined metal part and a screw.

The thickness of the optically transparent support 1 is preferably, but not particularly limited to, about 0.2 to about 5 mm.
<Photoelectric Conversion Layer>
The photoelectric conversion layer refers to a layer containing a photosensitizer adsorbed on a porous semiconductor layer filled with a carrier-transport material. In the case where the porous semiconductor layer is formed of two or more layers as described in the present invention, the photoelectric conversion layer refers to a layer containing a photosensitizer adsorbed on each of the porous semiconductor layers filled with a carrier-transport material.
—Porous Semiconductor Layer—
The porous semiconductor layer is preferably formed of fine semiconductor particles and in the form of a film having many fine pores. In the present invention, the term "porous" indicates that the specific surface area is 0.5 to 300 $m^2/g$ and that the porosity is 20% or more. The specific surface area is determined by the Brunauer-Emmett-Teller (BET) method, which is a gas adsorption method. The porosity is determined by calculation from the thickness (film thickness) of the porous semiconductor layer, the mass of the porous semiconductor layer, and the density of the fine semiconductor particles. The porous semiconductor layer having a larger specific surface area can adsorb a larger amount of photosensitizer and thus can efficiently absorb sunlight. Furthermore, the porous semiconductor layer having a porosity of a predetermined value or more enables the carrier-transport material to diffuse sufficiently, thus allowing electrons to return smoothly to the photoelectric conversion layer.

The porous semiconductor layer according to the present invention includes a first porous semiconductor layer 2 and a second porous semiconductor layer 3 stacked on the optically transparent support 1. Each of the first porous semiconductor layer 2 and the second porous semiconductor layer 3 is formed of fine semiconductor particles having different particle sizes. The fine semiconductor particles preferably have an average particle size of 5 nm or more and less than 50 nm and more preferably 10 nm or more and 30 nm or less from the viewpoint of providing a sufficiently large effective surface area with respect to a projected area in order to convert incident light into electric energy in high yield. Here, the average particle size used in this specification refers to a value determined by applying the Scherrer equation to a spectrum (diffraction peaks obtained by X-ray diffraction (XRD)) obtained by X-ray diffraction measurement, or a value visually identified by direct observation with a scanning electron microscope (SEM) as described below. In the case where the first porous semiconductor layer 2 and the second porous semiconductor layer 3 need not be distinguished, the term "porous semiconductor layer" is simply used.

In the case where the fine semiconductor particles constituting the porous semiconductor layer have a large average particle size, the porous semiconductor layer has excellent light scattering properties, depending on the formation conditions and so forth. Thus, the porous semiconductor layer scatters incident light to improve the light-harvesting efficiency. The adjustment of the particle size (average particle size) of the fine semiconductor particles used to form the photoelectric conversion layer results in the adjustment of the light scattering properties of the photoelectric conversion layer, in other words, the light absorption properties of the photoelectric conversion layer. In the case where the fine semiconductor particles constituting the porous semiconductor layer have a small average particle size, the porous semiconductor layer has a larger number of adsorption sites for the photosensitizer. Thus, the amount of the photosensitizer adsorbed is increased. Therefore, the fine semiconductor particles constituting a layer (second porous semiconductor layer 3) of the porous semiconductor layers located closest to the counter electrode 6 preferably have an average particle size of 100 nm or more and more preferably 100 nm or more and 600 nm or less.

However, the inventors have found that in the case where the fine semiconductor particles constituting the porous semiconductor layer have an average particle size of more than 380 nm, the resistance (the resistance may include the interfacial resistance between the porous semiconductor layer and the conductive layer 4; and when the porous semiconductor layer is constituted of two or more layers, the resistance may also include the interfacial resistance between the layers) is increased to significantly reduce a current generated. Thus, the average particle size of the fine semiconductor particles constituting the layer (second porous semiconductor layer 3), which is closer to the counter electrode 6, in the porous semiconductor layers is preferably 380 nm or less. In this case, although the details are not clear, the resistance value measured by an alternating current impedance method is reduced, thereby preventing an increase in resistance. More preferably, the fine semiconductor particles constituting the second porous semiconductor layer 3 have an average particle size of 200 nm or more and 300 nm or less.

In the case where the second porous semiconductor layer 3 contains the fine semiconductor particles having a particle size of more than 380 nm, the second porous semiconductor layer 3 preferably contains the fine semiconductor particles having a particle size of 10 nm or more and 100 nm or less. The content of the fine semiconductor particles having a particle size of 10 nm or more and 100 nm or less is not particularly limited and may be set in such a manner that the fine semiconductor particles constituting the second porous semiconductor layer 3 have an average particle size of 380 nm or less. For example, the content may be 40% by mass or more and 90% by mass or less. This prevents a significant reduction in current generated due to an increase in the interfacial resistance between the porous semiconductor layer and the conductive layer 4 or between the porous semiconductor layers attributed to the large average particle size of the fine semiconductor particles.

In the case where the conductive layer 4 is formed by, for example, an evaporation method, when the fine semiconductor particles constituting the second porous semiconductor layer 3 have an average particle size of less than 170 nm, the conductive layer 4 cannot have a sufficient pore size. Thus, the conductive layer 4 is clogged with a conductive material constituting the conductive layer 4, thereby inhibiting the transfer of an electrolytic solution. This possibly leads to a reduction in Jsc. To prevent the occurrence of the defect, the fine semiconductor particles constituting the second porous semiconductor layer 3 preferably have an average particle size of 170 nm or more. Preferably, the conductive layer 4 is not formed of fine conductive particles having an average particle size of 10 nm or more.

In the case where the conductive layer 4 is formed by a method other than the evaporation method, for example, in the case where the conductive layer 4 is formed by applying a conductive fine particle paste by screen printing, it is possible to prevent the occurrence of the defect in which the transfer of the electrolytic solution in the conductive layer 4 is prevented even if the fine semiconductor particles constituting the second porous semiconductor layer 3 have an average particle size of less than 170 nm. Thus, in the case where the conductive layer 4 is formed by a method other than the evaporation method, the average particle size of the fine semiconductor particles constituting the second porous semiconductor layer 3 is not particularly limited and may be less than 170 nm.

In each of the first porous semiconductor layer 2 and the second porous semiconductor layer 3, variations in the particle size of the fine semiconductor particles are not particularly limited. However, the fine semiconductor particles preferably have a uniform particle size to some extent similarly to commercially available fine semiconductor particles from the viewpoint of effectively using incident light for photoelectric conversion.

The porous semiconductor layer may be monocrystalline or polycrystalline. However, the porous semiconductor layer is preferably formed of a polycrystalline sintered body composed of the fine semiconductor particles in view of stability, difficulty of growing crystals, production cost, and so forth.

A material (semiconductor material) constituting the porous semiconductor layer is not particularly limited as long as the material can be commonly used for photoelectric conversion elements and can provide the advantageous effect of the present invention. Examples of the material include semiconductor compounds, such as titanium oxide, zinc oxide, tin oxide, iron oxide, niobium oxide, cerium oxide, tungsten oxide, barium titanate, strontium titanate, cadmium sulfide, lead sulfide, zinc sulfide, indium phosphide, copper-indium sulfide ($cuInS_2$), $CuAlO_2$, and $SrCu_2O_2$. They may be used separately or in combination. Among these materials, titanium oxide is particularly preferably used in view of photoelectric conversion efficiency, stability, and safety.

In the case where titanium oxide is used as a material constituting the porous semiconductor layer, titanium oxide may be anatase titanium oxide, rutile titanium oxide, amorphous titanium oxide, any of various titanium oxides in a narrow sense, for example, metatitanic acid or orthotitanic acid, titanium hydroxide, or hydrous titanium oxide. These compounds may be used separately or in combination as a mixture. Regarding anatase titanium oxide, rutile titanium oxide, while the structure depends on the production process and the heat history, anatase titanium oxide is commonly used.

The thickness of the porous semiconductor layer is not particularly limited. However, the photoelectric conversion layer preferably has a thickness of about 0.1 to about 50 µm in view of photoelectric conversion efficiency. In particular, in the case where a high-light-scattering porous semiconductor layer formed of the fine semiconductor particles having an average particle size of 100 nm or more and 600 nm or less is provided, the photoelectric conversion layer preferably has a thickness of 0.1 to 40 µm and more preferably 5 to 20 µm. The thickness of the porous semiconductor layer may be set in light of this point.

To improve the photoelectric conversion efficiency, described below, it is necessary to form the photoelectric conversion layer that adsorbs a larger amount of the photosensitizer described below. Thus, a layer having a large specific surface area is preferably used as the porous semiconductor layer. For example, the porous semiconductor layer with a BET specific surface area of about 10 to about 200 $m^2/g$ is preferably used. Even if the porous semiconductor layer is in the form of fine particles, the foregoing specific surface area is preferably achieved in view of the amount of dye adsorbed.

A method for forming a porous semiconductor layer is not particularly limited. Examples of the method that may be employed include (1) a method in which a paste containing fine semiconductor particles is applied to an optically transparent substrate by, for example, a screen printing method or an ink jet method and then fired; (2) a method in which a porous semiconductor layer is formed on an optically transparent substrate by, for example, a CVD method or an MOCVD method with a desired source gas; (3) a method in which a porous semiconductor layer is formed on an optically transparent substrate by, for example, a PVD method, an evaporation method, or a sputtering method with a solid raw material; and (4) a method in which a porous semiconductor layer is formed on an optically transparent substrate by, for example, a sol-gel method or an electrochemical method. Among these methods, the screen printing method with a paste is particularly preferred from the viewpoint of forming a relatively thick porous semiconductor layer at low cost.

A method for forming a porous semiconductor layer with anatase titanium oxide serving as the semiconductor material (in the following description, referred to simply as "titanium oxide") will be specifically described below.

First, 125 mL of titanium isopropoxide is hydrolyzed by the dropwise addition of 750 mL of a 0.1 M nitric acid aqueous solution and heated at 80° C. for 8 hours to prepare a sol. The resulting sol is heated at 230° C. for 11 hours in an autoclave composed of titanium to grow titanium oxide particles and then is subjected to ultrasonic dispersion for 30 minutes at room temperature, thereby preparing a colloidal solution containing titanium oxide particles having an average particle size (average primary particle size) of 15 nm. Then the volume of ethanol which is twice the volume of the colloidal solution is added to the colloidal solution. The mixture is subjected to centrifugation at 5000 rpm to separate titanium oxide particles from the solvent. Thereby, the titanium oxide particles are formed.

The resulting titanium oxide particles are washed and then added to a solution prepared by dissolving ethyl cellulose and terpineol in absolute ethanol, thereby preparing a liquid mixture. The titanium oxide particles are dispersed in the liquid mixture by stirring. The liquid mixture is heated under vacuum conditions to evaporate ethanol, thereby providing a titanium oxide paste. The concentration is adjusted in such a manner that, for example, the titanium oxide paste has a solid titanium oxide concentration of 20% by mass, an ethyl cellulose concentration of 10% by mass, and a terpineol concentration of 70% by mass as an ultimate composition. The ultimate composition of the titanium oxide paste is illustrative and is not limited to the foregoing description.

As the solvent used to prepare the titanium oxide paste, in other words, a paste containing fine semiconductor particles (dispersed), examples thereof include glyme solvents, such as ethylene glycol monomethyl ether; alcohol solvents, such as isopropyl alcohol; solvent mixtures of, for example, isopropyl alcohol and toluene; and water, in addition to the foregoing solvent.

The resulting titanium oxide paste is applied to an optically transparent substrate by any of the methods (1) to (4) described above and fired, thereby forming a porous semiconductor layer. For example, the temperature, time, and atmosphere used for drying and firing need to be appropriately adjusted, depending on materials of the optically transparent support and the fine semiconductor particles used. The firing is preferably performed at about 50° C. to about 800° C. for about 10 seconds to about 12 hours in an air atmosphere or inert gas atmosphere. Each of the drying and the firing may be performed once at a constant temperature or may be performed twice or more at different temperatures. The resulting porous semiconductor layer has a BET specific surface area of 10 to 200 $m^2/g$.

In the present invention, the porous semiconductor layer may be formed of three or more layers. In the case where the porous semiconductor layer is formed of three or more layers, fine semiconductor particles constituting the porous semiconductor layer located closer to the counter electrode 6 may have an average particle size of 380 nm or less.

—Photosensitizer—

Examples of the photosensitizer include dyes and quantum dots. The dyes may include various organic dyes that absorb light in the visible region and/or light in the infrared region; and metal complex dyes that absorb light in the visible region and/or light in the infrared region. These dyes may be used separately or in combination of two or more as a mixture.

Examples of the organic dyes include azo-based dyes, quinone-based dyes, quinonimine-based dyes, quinacridone-based dyes, squarylium-based dyes, cyanine-based dyes, merocyanine-based dyes, triphenylmethane-based dyes, xanthene-based dyes, porphyrin-based dyes, perylene-based dyes, indigo-based dyes, and naphthalocyanine-based dyes. In general, organic dyes have larger extinction coefficients than metal complex dyes each having a structure in which a molecule is coordinated with a transition metal.

Examples of the metal complex dyes include metal complex dyes each having a structure in which a ligand is coordinated with a metal atom, for example, Cu, Ni, Fe, Co, V, Sn, Si, Ti, Ge, Cr, Zn, Ru, Mg, Al, Pb, Mn, In, Mo, Y, Zr, Nb, Sb, La, W, Pt, Ta, Ir, Pd, Os, Ga, Tb, Eu, Rb, Bi, Se, As, Sc, Ag, Cd, Hf, Re, Au, Ac, Tc, Te, or Rh. The metal complex dyes may be, for example, porphyrin-based dyes, phthalocyanine-based dyes, or naphthalocyanine-based dyes. Among these dyes, phthalocyanine-based dyes or ruthenium-based dyes are preferred. Ruthenium-based dyes are more preferred. Ruthenium-based dyes represented by the chemical formulae (1) to (3) are still more preferred.

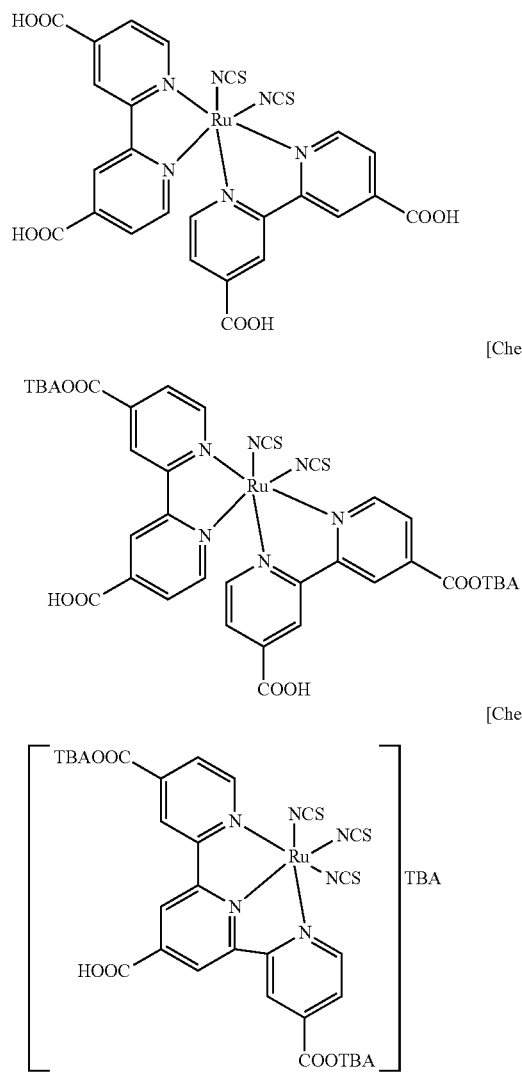

[Chem. 1]

[Chem. 2]

[Chem. 3]

To allow the photosensitizer to adsorb strongly to the porous semiconductor layer, the photosensitizer preferably contains an interlocking group, for example, a carboxy group, an alkoxy group, a hydroxy group, a sulfonic group, an ester group, a mercapto group, or a phosphonyl group, in its molecule. Among these, the photosensitizer preferably contains at least one of the carboxy group and a carboxylic anhydride group in its molecule. In general, the interlocking group is present between the photosensitizer and the porous semiconductor layer upon fixing the photosensitizer in the porous semiconductor layer and provides electrical connection that facilitates the transfer of electrons between the excited state of the photosensitizer and the conduction band of the semiconductor material constituting the porous semiconductor layer.

Examples of quantum dots functioning as a photosensitizer include CdS, CdSe, PbS, and PbSe. The size (particle size) thereof is appropriately adjusted, depending on an absorption wavelength and so forth, and is preferably about 1 nm to about 10 nm.

A typical example of a method for adsorbing the photosensitizer to the porous semiconductor layer is a method in which the porous semiconductor layer is immersed in a solution containing the photosensitizer dissolved therein (hereinafter, also referred to as a "dye adsorption solution"). In this case, the dye adsorption solution is preferably heated so as to penetrate deep into micropores of the porous semiconductor layer.

Any solvent capable of dissolving the photosensitizer may be used for the dye adsorption solution. Examples thereof include alcohols, toluene, acetonitrile, tetrahydrofuran (THF), chloroform, and dimethylformamide. Usually, these solvents are preferably purified before use and may be used in combination of two or more as a mixture. The dye concentration in the dye adsorption solution may be appropriately set, depending on conditions, such as the type of the photosensitizer used, the type of the solvent used, and a dye adsorption step. To improve adsorption performance for the dye, the concentration is preferably maximized as much as possible. For example, the concentration is preferably $5 \times 10^{-4}$ mol/liter or more.

The amount of the photosensitizer adsorbed may be $1 \times 10^{-9}$ mol/cm$^2$ or more and $1 \times 10^{-5}$ mol/cm$^2$ or less and preferably $1 \times 10^{-8}$ mol/cm$^2$ or more and $1 \times 10^{-6}$ mol/cm$^2$ or less. When the amount of the photosensitizer adsorbed is less than $1 \times 10^{-9}$ mol/cm$^2$, the photoelectric conversion efficiency can be reduced. When the amount of the photosensitizer adsorbed is more than $1 \times 10^{-5}$ mol/cm$^2$, Jsc can be reduced by the filter effect of the dye that does not adsorb on a surface of titanium oxide.

—Carrier-Transport Material—

The carrier-transport material may be a conductive material capable of transportions as described in <Carrier-transport material> mentioned below. For example, the carrier-transport material may be a liquid electrolyte, a solid electrolyte, a gel electrolyte, or a molten-salt gel electrolyte. The carrier-transport material contained in the porous semiconductor layer may be the same as the carrier-transport material A1 provided between the conductive layer 4 and the counter electrode 6 or may be different from the carrier-transport material A1.

A method for providing the carrier-transport material in the porous semiconductor layer is not particularly limited. The porous semiconductor layer may be immersed in a solution containing the carrier-transport material. After the optically transparent support 1 and the counter electrode 6 are bonded together, an electrolytic solution may be injected therebetween through an injection hole formed in advance. In the case where the carrier-transport material in the porous semiconductor layer is the same as the carrier-transport material A1 provided between the conductive layer 4 and the counter electrode 6, a method may be employed in which the carrier-transport material is provided between the conductive layer 4 and the counter electrode 6, so that the carrier-transport material A1 is included in the porous semiconductor layer.

<Conductive Layer>

The conductive layer 4 functions as a collecting electrode. The conductive layer 4 may not be optically transparent or may be optically transparent because the conductive layer 4 is provided on a non-light-receiving surface of the porous semiconductor layer serving as a power-generating layer.

In the conductive layer 4, the carrier-transport material can be preferably transferred in the direction perpendicular to the conductive layer. In this case, electrons transferred to the counter electrode 6 can be smoothly transferred to the photoelectric conversion layer. Here, the carrier-transport material may be a conductive material capable of transporting ions as described in <Carrier-transport material> mentioned below.

A material constituting the conductive layer 4 preferably has corrosion resistance to the carrier-transport material and may be, for example, tin oxide, a compound oxide of indium and tin (ITO), fluorine-doped tin oxide (PTO), indium oxide, tin-doped indium oxide, or zinc oxide (ZnO). Furthermore, the conductive layer 4 may be composed of a metal, for example, titanium, nickel, molybdenum, or tantalum, having corrosion resistance to the carrier-transport material.

The conductive layer 4 preferably has a plurality of pores formed therein. The carrier-transport material moves repeatedly between the photoelectric conversion layer and the counter electrode 6 in the principle of the photoelectric conversion element. In the case where the plural pores are formed the conductive layer 4, the foregoing movement of the carrier-transport material is efficiently performed. While the pore size varies depending on the type of carrier-transport material, the pore size is preferably about 0.1 μm to about 100 μm and more preferably about 1 μm to about 50 μm. For the same reason, the conductive layer 4 preferably contains any of materials listed in <Carrier-transport material> mentioned below.

A method for forming the conductive layer 4 is not particularly limited and may be a known method, for example, an evaporation method or a sputtering method. The conductive layer 4 suitably has a thickness of about 0.02 to about 5 μm. A lower sheet resistance of the conductive layer 4 is better. In particular, the conductive layer 4 preferably has a sheet resistance of 40 Ω/sq or less.

<Carrier-Transport Material>

In the photoelectric conversion element illustrated in FIG. 1, the carrier-transport material A1 is provided in a space sealed with the optically transparent support 1, the counter electrode 6, and the sealing member 7.

The carrier-transport material A1 is composed of a conductive material capable of transportions. Examples of the material that may be suitably used include liquid electrolytes, solid electrolytes, gel electrolytes, and molten-salt gel electrolytes.

The liquid electrolytes may be liquid materials containing redox species. Any liquid electrolyte that may be commonly used in, for example, batteries or solar cells, may be used without any particular limitation. Specific examples of the liquid electrolyte include a liquid electrolyte containing a redox species and a solvent capable of dissolving the redox species; a liquid electrolyte containing a redox species and a molten salt capable of dissolving the redox species; a liquid electrolyte containing a redox species, the solvent, and the molten salt.

Examples of the redox species include an $I^-/I^{3-}$ system, a $Br^{2-}/Br^{3-}$ system, an $Fe^{2+}/Fe^{3+}$ system, and a quinone/hydroquinone system. Specific examples of the redox species that may be used include combinations of iodine ($I_2$) with a metal iodide, for example, lithium iodide (LiI), sodium iodide (NaI), potassium iodide (KI), or calcium iodide ($CaI_2$). Specific examples of the redox species that may be used include combinations of iodine with a tetraalkylammonium salt, for example, tetraethylammonium iodide (TEAI), tetrapropylammonium iodide (TPAI), tetrabutylammonium iodide (TBAI), or tetrahexylammonium iodide (THAI). Specific examples of the redox species that may be used include combinations of bromine with a metal bromide, for example, lithium bromide (LiBr), sodium bromide (NaBr), potassium bromide (KBr), or calcium bromide ($CaBr_2$). Among these compounds, the combination of $I_2$ with LiI is particularly preferred.

Examples of a solvent capable of dissolving the redox species include carbonate compounds, such as propylene carbonate; nitrile compounds, such as acetonitrile; alcohols, such as ethanol; water; and aprotic polar substances. Among these compounds, carbonate compounds and nitrile compounds are particularly preferred. These solvents may also be used in combination of two or more as a mixture.

The solid electrolytes may be conductive materials which are capable of transporting electrons, holes, and ions, which can be used as electrolytes for photoelectric conversion elements, and which have no flowability. Specific examples of the solid electrolytes include hole-transport materials, such as polycarbazole; electron-transport materials, such as tetranitrofluorenone; conductive polymers, such as polylol; polyelectrolytes prepared by solidifying liquid electrolytes with macromolecular compounds; p-type semiconductors, such as copper iodide and copper thiocyanate; and electrolytes prepared by solidifying liquid electrolytes containing molten salts with fine particles.

The gel electrolytes are each composed of an electrolyte and a gelling agent, in general. The electrolyte may be, for example, the liquid electrolyte or the solid electrolyte.

Examples of the gelling agent include polymer gelling agents, such as cross-linked polyacrylic resin derivatives, cross-linked polyacrylonitrile derivatives, polyalkylene oxide derivatives, silicone resins, and polymers each having a nitrogen-containing heterocyclic quaternary compound salt structure in a side chain.

Usually, the molten-salt gel electrolytes are each composed of the foregoing gel electrolyte and an ambient temperature molten salt.

Examples of the ambient-temperature molten salt include nitrogen-containing heterocyclic quaternary ammonium salts, such as pyridinium salts and imidazolium salts.

An additive described below may be contained between the conductive layer 4 and the counter electrode 6, as needed. The additive may be a nitrogen-containing aromatic compound, for example, tert-butylpyridine (TBP), or an imidazole salt, for example, dimethylpropylimidazole iodide (DMPII), methylpropylimidazole iodide (MPII), ethylmethylimidazole iodide (EMII), ethylimidazole iodide (EII), or hexylmethylimidazole iodide (HMII).

The concentration of the electrolyte is preferably in the range of 0.001 to 1.5 mol/L and particularly preferably 0.01 to 0.7 mol/L. In the case where a catalyst layer is located on the light-receiving side in the photoelectric conversion element according to the present invention, incident light passes through an electrolytic solution and reaches the porous semiconductor layer on which a dye adsorbs, thereby exciting carriers.

<Counter Electrode>

The counter electrode 6 is an electrode opposite the conductive layer 4. The counter electrode 6 may include a catalyst layer having the function of reducing holes in the carrier-transport material and a conductive layer having the function of collecting at least electrons and be connected in series to an adjacent solar cell. The counter electrode 6 may be formed of a single layer having these functions. For example, in the case where the catalyst layer has high conductivity, the counter electrode 6 may be formed of the catalyst layer. In the case where the conductive layer has catalytic activity, the counter electrode 6 may be formed of the conductive layer. Furthermore, the present invention also includes an embodiment in which another catalyst layer is provided separately from the counter electrode 6.

A material constituting the conductive layer is not particularly limited as long as the material can be commonly used for solar cells and can provide the advantageous effect of the present invention. The material may be a metal oxide, for example, a compound oxide of indium and tin (ITO), fluorine-doped tin oxide (FTC)), or zinc oxide (ZnO), or may be a metal material, for example, titanium, tungsten, gold, silver, copper, or nickel. The conductive layer is preferably composed of titanium in view of the film strength of the conductive layer.

A material constituting the catalyst layer is not particularly limited as long as the material can be commonly used for solar cells and can provide the advantageous effect of the present invention. The material may be, for example, platinum or carbon. The carbon may be in the form of carbon black, graphite, glassy carbon, amorphous carbon, hard carbon, soft carbon, carbon whisker, carbon nanotubes, or a fullerene.

In the case where the catalyst layer is composed of platinum, the catalyst layer may be formed by a known method, for example, a PVC method, a sputtering method, an evaporation method, pyrolysis of platinic chloride, or electrodeposition. The catalyst layer appropriately has a thickness of, for example, about 0.5 nm to about 1000 nm.

In the case where the catalyst layer is composed of carbon, a paste prepared by dispersing carbon in a freely selected solvent is applied by, for example, a screen printing method to form the catalyst layer. Also in this case, the catalyst layer appropriately has a thickness of, for example, about 0.5 nm to about 1000 nm.

<Sealing Member>

The sealing member 7 seals a stacked structure (the porous semiconductor layer and the conductive layer) provided on the optically transparent support 1. The sealing member 7 is important to prevent the evaporation of the electrolytic solution and the penetration of water into the cell. The sealing member 7 is also important to absorb a falling object or a stress (impact) acting on the optically transparent support 1 and the deformation of the optically transparent support 1 due to long-term use.

A material constituting the sealing member 7 is not particularly limited as long as the material can be commonly used for solar cells and can provide the advantageous effect of the present invention. Preferred examples of the material include silicone resins, epoxy resins, polyisobutylene-based resins, hot-melt resins, and glass frit. These materials may be used separately. Alternatively, two or more of these materials may be stacked to form a structure including two or more layers. In the case where a nitrile-based solvent or a carbonate-based solvent is used as a solvent for the redox species, the sealing member 7 is particularly preferably composed of a silicone resin, a hot-melt resin, (for example, an ionomer resin), a polyisobutylene-based resin, or glass frit.

Examples

While the present invention will be more specifically described below by examples, the present invention is not limited to these examples described below. In the examples described below, the thicknesses of layers were measured with a step profiler (E-VS-S28A by Tokyo Seimitsu Co., Ltd).

<Preparation of Fine Porous Semiconductor Particles>

First, 125 mL of titanium isopropoxide (manufactured by Kishida Chemical Co., Ltd.) and 750 mL of a 0.1 M nitric acid aqueous solution (manufactured by Kishida Chemical Co., Ltd.) serving as a pH adjusting agent were mixed together. The resulting mixture was heated at 80° C. for 8 hours. This allowed the hydrolysis reaction of titanium isopropoxide to proceed, thereby preparing a sol. The resulting sol was heated at 230° C. for 11 hours in an autoclave composed of titanium to grow particles.

The sol was subjected to ultrasonic dispersion for 30 minutes to prepare a colloidal solution A containing titanium oxide particles having an average particle size of 20 nm. The volume of ethanol which is twice the volume of the colloidal solution A was added to the colloidal solution A. The mixture was subjected to centrifugation at 5000 rpm to prepare titanium oxide particles. The average particle size of the $TiO_2$ particles in the colloidal solution was determined by the dynamic light-scattering analysis of laser light with a light scattering photometer (manufactured by Otsuka Electronics Co., Ltd).

A colloidal solution B and a colloidal solution C were prepared in the same procedure as the colloidal solution A except that the particle growth conditions were changed in the autoclave. The colloidal solution B contained $TiO_2$ particles having an average particle size of 510 nm. The colloidal solution B was prepared under the particle growth conditions: 200° C. for 17 hours. The colloidal solution C contained $TiO_2$ particles having an average particle size of 400 nm. The colloidal solution C was prepared under particle growth conditions: 210° C. for 20 hours. The $TiO_2$ particles in the colloidal solution B and the colloidal solution C were anatase-type titanium oxide particles.

Furthermore, colloidal solutions D to V described in Table 1 were prepared with the colloidal solutions A to C.

TABLE 1

| | Composition (% by mass) | | | |
|---|---|---|---|---|
| | Colloidal solution A (20 nm) | Colloidal solution B (510 nm) | Colloidal solution C (400 nm) | Average particle size (nm) |
| Colloidal solution A | 100 | 0 | 0 | 21 |
| Colloidal solution B | 0 | 100 | 0 | 505 |
| Colloidal solution C | 0 | 0 | 100 | 398 |
| Colloidal solution D | 10 | 0 | 90 | 362 |
| Colloidal solution E | 20 | 0 | 80 | 320 |
| Colloidal solution F | 30 | 0 | 70 | 285 |
| Colloidal solution G | 40 | 0 | 60 | 248 |
| Colloidal solution H | 50 | 0 | 50 | 210 |
| Colloidal solution I | 60 | 0 | 40 | 170 |
| Colloidal solution J | 70 | 0 | 30 | 129 |
| Colloidal solution K | 80 | 0 | 20 | 97 |
| Colloidal solution L | 90 | 0 | 10 | 58 |
| Colloidal solution M | 95 | 0 | 5 | 40 |
| Colloidal solution N | 10 | 90 | 0 | 469 |
| Colloidal solution O | 20 | 80 | 0 | 410 |
| Colloidal solution P | 30 | 70 | 0 | 360 |
| Colloidal solution Q | 40 | 60 | 0 | 310 |
| Colloidal solution R | 50 | 50 | 0 | 365 |
| Colloidal solution S | 60 | 40 | 0 | 316 |
| Colloidal solution T | 20 | 60 | 20 | 389 |
| Colloidal solution U | 20 | 50 | 30 | 379 |
| Colloidal solution V | 20 | 40 | 40 | 365 |

The titanium oxide particles prepared in the foregoing process were washed. A solution containing ethyl cellulose (manufactured by Kishida Chemical Co., Ltd.) and terpineol (Kishida Chemical Co., Ltd.) dissolved in absolute ethanol was added thereto. The mixture was stirred to disperse the titanium oxide particles. Ethanol was evaporated at 50° C. under a reduced pressure of 40 mbar, thereby preparing titanium oxide pastes A to V from the colloidal solutions A to V. The concentration was adjusted in such a manner that each of the titanium oxide pastes had a solid titanium oxide concentration of 20% by weight, an ethyl cellulose concentration of 10% by weight, and a terpineol concentration of 64% by weight as an ultimate composition.

<Measurement of Average Particle Size of Fine Semiconductor Particles>

To measure the average particle size of the fine titanium oxide particles, each of the titanium oxide pastes A to V was applied to a glass substrate by a doctor blade method and then dried. The titanium oxide pastes A to V were fired at 450° C. for 30 minutes in air. Regarding each of the porous semiconductor layers, the full width at half maximum of a peak at a diffraction angle of 25.28° (corresponding to the (101) plane of anatase) was determined by the θ/2θ measurement with an X-ray diffractometer. The average particle size of the fine titanium oxide particles was determined from the Scherrer equation with the value. Table 1 describes the results.

<Production of Photoelectric Conversion Element>

A photoelectric conversion element illustrated in FIG. 1 was produced.

A glass support (manufactured by Matsunami Glass Ind., Ltd.) serving as the optically transparent support 1 was prepared. The titanium oxide paste A was applied to the glass support with a screen printing plate having a 5 mm×5 mm pattern for a porous semiconductor layer and a screen printing machine (Model: LS-150, manufactured by Newlong Seimitsu Kogyo Co., Ltd.). Leveling was performed at room temperature for 1 hour. The resulting coating film was dried for 20 minutes in an oven set at 80° C. and then fired for 60 minutes in air with a furnace (Model: KDF P-100, manufactured by Denken Co., Ltd.) set at 500° C. The application, drying, and firing steps were repeated twice to form the first porous semiconductor layer 2 having a thickness of about 12 μm. Then each of the titanium oxide pastes A to V was applied onto the first porous semiconductor layer 2 in the same way as above. Thereby, titanium oxide films A to V (each serving as the second porous semiconductor layer) each having a thickness of 18 μm were formed.

A conductive layer composed of Ti was formed by an evaporation method on each of the titanium oxide films A to V (porous semiconductor layers). The conductive layer had a thickness of 500 nm.

The glass support including a stack of the first porous semiconductor layer, the second porous semiconductor layer, and the conductive layer was immersed in a dye adsorption solution prepared in advance at room temperature for 100 hours. The glass support was washed with ethanol and dried at about 60° C. for about 5 minutes. This allowed a dye to adsorb on the first porous semiconductor layer 2 and the second porous semiconductor layer 3, thereby forming a photoelectric conversion layer.

The dye adsorption solution was prepared by dissolving the dye represented by the chemical formula (2) described above (trade name: Ruthenizer 620 1H3TBA, manufactured by Solaronix SA.) in a acetonitrile-tert-butanol (1:1 in volume) solvent mixture and had a dye concentration of $4 \times 10^{-4}$ mol/L.

A transparent electrode substrate (glass with a $SnO_2$ film, manufactured by Nippon Sheet Glass Company, Ltd) was prepared. A platinum film was formed as a catalyst layer by a sputtering method so as to cover a surface of the $SnO_2$ film. The platinum film had a thickness of about 7 nm.

The glass support including the stack and the transparent electrode substrate including the catalyst layer were bonded together using a heat-sealing film (Himilan 1855, manufactured by E.I. du Pont de Nemours and Company) cut out so as to surround the periphery of the stack, and then heated for 10 minutes in an oven set at about 100° C. Thereby, the glass support and the transparent electrode substrate were press-bonded.

An electrolytic solution was injected through an injection hole previously formed in the glass support. The injection hole was sealed with an ultraviolet curable resin (Model: 31X-101, manufactured by ThreeBond Co., Ltd), thereby providing a dye-sensitized solar cell (single cell) including the carrier-transport material A1 with which the clearance between the optically transparent support 1 and the counter electrode 6 is filled.

The electrolytic solution was prepared by dissolving LiI (redox species, manufactured by Aldrich) in a concentration of 0.1 mol/L, $I_2$ (redox species, manufactured by Kishida Chemical Co., Ltd.) in a concentration of 0.01 mol/L, tert-butylpyridine (additive, manufactured by Aldrich) in a concentration of 0.5 mol/L, and dimethylpropylimidazole iodide (manufactured by Shikoku Chemicals Corporation) in a concentration of 0.6 mol/L, in acetonitrile serving as a solvent.

<Measurement of Conversion Efficiency>

Figure 2:
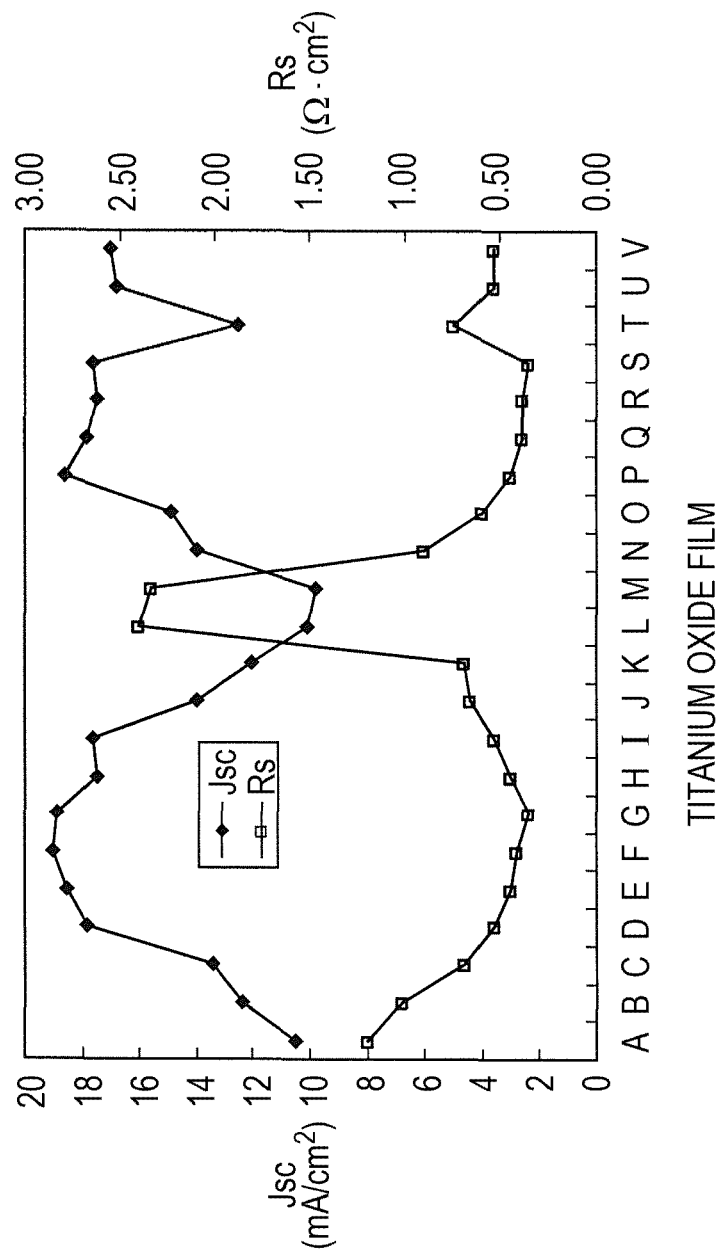
FIG. 2 is a graph illustrating the results of examples.

A Ag paste (trade name: Dotite, manufactured by Fujikura Kasei Co., Ltd.) serving as a collecting electrode portion was applied to the resulting dye-sensitized solar cell by a known method. A black mask having an opening portion with an area of 0.22 $cm^2$ was arranged on a light-receiving surface of the dye-sensitized solar cell. A short-circuit current density was measured by irradiating the dye-sensitized solar cell with light having an intensity of 1 $kW/m^2$ (AM 1.5 solar simulator). FIG. 2 illustrates the results. FIG. 2 illustrates the measurement results of the short-circuit current density Jsc and the calculation results of the interfacial resistance Rs described below.

<Interfacial Resistance Rs and Transfer Resistance of Electrolytic Solution RL>

Figure 3:
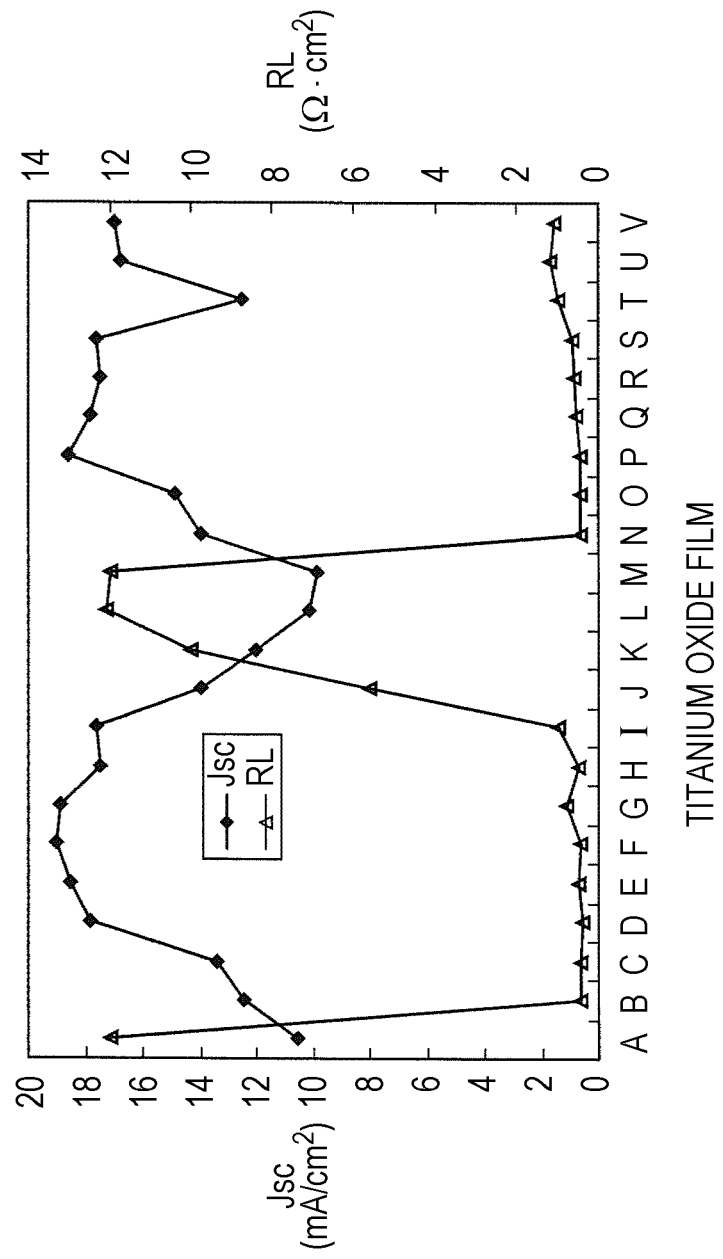
FIG. 3 is a graph illustrating other results of the examples.

An alternating current with a voltage amplitude of 20 mV and a voltage frequency of 100 kHz to 0.1 kHz was applied to between the conductive layer and the counter electrode of the resulting dye-sensitized solar cell, thereby determining the real part and the imaginary part of the impedance. A complex impedance plot was formed by plotting the real part of the impedance on the horizontal axis and the imaginary part on the vertical axis. The interfacial resistance Rs and the transfer resistance RL of the electrolytic solution were calculated using the resulting complex impedance plot. FIGS. 2 and 3 illustrate the results. FIG. 3 illustrates the measurement results of the short-circuit current density Jsc and the calculation results of the transfer resistance RL of the electrolytic solution.

The results illustrated in FIGS. 2 and 3 demonstrate that the dye-sensitized solar cell that satisfies the constituent features of the present invention exhibits a high short-circuit current density Jsc. For example, when the fine semiconductor particles constituting the second porous semiconductor layer 3 had an average particle size of 380 nm or less, a high short-circuit current density Jsc was observed. In particular, when the average particle size was 100 nm or more and 380 nm or less, a high short-circuit current density Jsc was observed, compared with the case where the average particle size was outside the range.

It should be understood that the embodiments and the examples disclosed herein are illustrative and not limitative in any respect. The scope of the present invention is defined by the terms of the claims, rather than the description of the embodiments above, and is intended to include any modifications within the scope and meaning equivalent to the terms of the claims.

REFERENCE SIGNS LIST

1 optically transparent support, 2 first porous semiconductor layer, 3 second porous semiconductor layer, 4 conductive layer, 6 counter electrode, 7 sealing member, A1 carrier-transport material

The invention claimed is:

1. A photoelectric conversion element comprising:
an optically transparent support, a porous semiconductor layer containing fine semiconductor particles and a photosensitizer, a conductive layer, and a counter electrode provided in that order, each of the porous semiconductor layer and the conductive layer containing a carrier-transport material,
wherein the porous semiconductor layer includes at least two layers each containing fine semiconductor particles having different particle sizes,
the fine semiconductor particles contained in the layer located closest to the counter electrode of the at least two layers constituting the porous semiconductor layer have an average particle size of 380 nm or less and are the largest of the average particle size of the fine semiconductor particles contained in the at least two layers constituting the porous semiconductor layer,
the layer located closest to the counter electrode of the layers constituting the porous semiconductor layer directly comes into contact with the conductive layer, and
wherein the conductive layer directly contacts the optically transparent support.

2. The photoelectric conversion element according to claim 1, wherein the layer located closest to the counter electrode of the at least two layers constituting the porous semiconductor layer contains the fine semiconductor particles having an average particle size of 10 nm or more and 100 nm or less.

3. The photoelectric conversion element according to claim 2, wherein the layer located closest to the counter electrode of the at least two layers constituting the porous semiconductor layer contains the fine semiconductor particles having an average particle size of 10 nm or more and 100 nm or less in an amount of 40% by mass or more and 90% by mass or less.

4. The photoelectric conversion element according to claim 1, wherein the conductive layer is not formed of the fine conductive particles having an average particle size of 10 nm or more, and
the layer located closest to the counter electrode of the at least two layers constituting the porous semiconductor layer contains the fine semiconductor particles having an average particle size of 170 nm or more.

5. The photoelectric conversion element according to claim 1, wherein the fine semiconductor particles comprise titanium oxide.

6. The photoelectric conversion element according to claim 1, wherein the conductive layer has corrosion resistance to the carrier-transport material.

7. The photoelectric conversion element according to claim 6, wherein the conductive layer comprises at least one of titanium, nickel, and molybdenum.

* * * * *